United States Patent
Berels et al.

(10) Patent No.: US 11,319,732 B2
(45) Date of Patent: May 3, 2022

(54) PRE-FLUXING MOTORS OF VEHICLE DOOR E-LATCHES

(71) Applicant: Ford Global Technologies, LLC, Dearborn, MI (US)

(72) Inventors: David Jeffeory Berels, Plymouth, MI (US); Christopher Matthew Radjewski, Macomb Township, MI (US); Laura Viviana Hazebrouck, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 804 days.

(21) Appl. No.: 16/104,471

(22) Filed: Aug. 17, 2018

(65) Prior Publication Data

US 2020/0056408 A1 Feb. 20, 2020

(51) Int. Cl.
*E05B 81/76* (2014.01)
*E05B 81/04* (2014.01)
(Continued)

(52) U.S. Cl.
CPC .............. *E05B 81/76* (2013.01); *E05B 81/04* (2013.01); *E05B 81/66* (2013.01); *E05B 85/10* (2013.01);
(Continued)

(58) Field of Classification Search
CPC ...... G07C 2009/00634; G07C 2209/65; E05B 81/58; E05B 81/60; E05B 81/77; E05B 81/04; E05B 81/16; E05B 81/54; E05B 81/64; E05B 81/76; E05B 81/12; E05B 81/66; E05B 81/78; E05B 2047/0048; E05B 2047/005; E05B 2047/0052;
(Continued)

(56) References Cited

U.S. PATENT DOCUMENTS 5,203,112 A   4/1993   Yamagishi et al.
5,708,338 A   1/1998   Cook et al.
(Continued)

FOREIGN PATENT DOCUMENTS

JP        4127457 B2      7/2008
WO    WO 2014082175 A1   6/2014

OTHER PUBLICATIONS

Jonathan Law and Richard Rennie, Electric Motor in A Dictionary of Physics, 2015, Oxford University Press, 7th edition (Year: 2015).*

(Continued)

*Primary Examiner* — Kristina R Fulton
*Assistant Examiner* — Emily G. Brown
(74) *Attorney, Agent, or Firm* — Frank Lollo; Eversheds Sutherland (US) LLP (57) ABSTRACT

Method and apparatus are disclosed for pre-fluxing motors of vehicle door e-latches. An example vehicle includes a door including a handle that includes a switch. The handle also includes an e-latch that includes a latch and a motor for the latch. Responsive to detecting grasping of the handle via the switch, the e-latch is to pre-flux the motor and transmit an authentication request. The example vehicle also includes a body control module to cause the motor to unlock the door via the latch responsive to authenticating a fob upon receiving the authentication request.

19 Claims, 4 Drawing Sheets

(51) Int. Cl.
*H02P 7/10* (2006.01)
*E05B 81/66* (2014.01)
*B60R 25/24* (2013.01)
*E05B 85/10* (2014.01)
*G07C 9/28* (2020.01)

(52) U.S. Cl.
CPC ............... *G07C 9/28* (2020.01); *H02P 7/10* (2013.01); *B60R 25/24* (2013.01)

(58) Field of Classification Search
CPC ..... E05B 2047/0053; E05B 2047/0054; E05B 2047/0056; E05B 2047/0083; E05B 2047/0084; E05B 2047/0072; E05B 85/10; H02P 7/10; B60R 25/24; B60R 25/246; H01F 13/00
See application file for complete search history.

(56) References Cited

U.S. PATENT DOCUMENTS

| | | | | |
|---|---|---|---|---|
| 6,799,107 | B2* | 9/2004 | Mushiake | E05B 81/78 70/257 |
| 6,801,134 | B1* | 10/2004 | Juzswik | B60R 25/24 340/12.51 |
| 7,210,713 | B2 | 5/2007 | Yoshida et al. | |
| 7,465,610 | B2* | 12/2008 | Nadd | H02H 7/0838 257/288 |
| 7,642,669 | B2* | 1/2010 | Spurr | E05B 81/82 307/9.1 |
| 9,080,352 | B2* | 7/2015 | Aerts | E05B 85/18 |
| 10,819,105 | B2* | 10/2020 | Meisel | H01H 50/16 |
| 2002/0180273 | A1* | 12/2002 | Konno | B60R 25/24 307/10.2 |
| 2007/0257772 | A1* | 11/2007 | Marcelle | G07C 9/00912 340/5.64 |
| 2008/0012694 | A1* | 1/2008 | Daghan | G07C 9/00309 340/426.36 |
| 2008/0060393 | A1* | 3/2008 | Johansson | E05B 47/063 70/91 |
| 2008/0178648 | A1* | 7/2008 | Jansseune | B60R 25/246 70/257 |
| 2009/0085720 | A1* | 4/2009 | Kurpinski | B60R 25/246 340/5.64 |
| 2015/0330117 | A1* | 11/2015 | Van Wiemeersch | E05B 85/14 292/96 |
| 2018/0100332 | A1* | 4/2018 | Brombach | E05F 15/73 |

OTHER PUBLICATIONS

Jim Brown, "Brief H-Bridge Theory of Operation," Apr. 1998 (updated Sep. 2002), Dallas Personal Robotics Group, https://web.archive.org/web/20030814074545/http://www.dprg.org/tutorials/1998-04a/ (Year: 2002).*

Hsin-Chuan Chen, "An H-Bridge Driver Using Gate Bias for DC Motor Control," 2013 IEEE 17th International Symposium on Consumer Electronics, pp. 265-266 (Year: 2013).*

Robert_Fay, "Inrush Current," Nov. 2017, Digi-Key, https://forum.digikey.com/t/inrush-current/679 (Year: 2017).*

"Voltage sag due to induction motor starting," Apr. 1, 2018, Voltage Disturbance, https://voltage-disturbance.com/power-engineering/voltage-sag-due-to-induction-motor-starting/ (Year: 2018).*

S. Hu, Z. Zhao, T. Lu and L. Yuan, "DC pre-excitation application in three-phase induction motor drive system," The 2nd International Symposium on Power Electronics for Distributed Generation Systems, 2010, pp. 389-393, doi: 10.1109/PEDG.2010.5545809. (Year: 2010).*

* cited by examiner

PRE-FLUXING MOTORS OF VEHICLE DOOR E-LATCHES

TECHNICAL FIELD

The present disclosure generally relates to e-latches and, more specifically, to pre-fluxing motors of vehicle door e-latches.

BACKGROUND

Typically, keys are utilized to unlock and lock doors of a vehicle and to activate an engine of the vehicle. Traditionally, mechanical keys have been utilized to unlock vehicle doors and to activate ignition of vehicle engines. For instance, a mechanical key is inserted into a keyhole and rotated to unlock a door and/or to start an engine. Recently, key fobs have been utilized to unlock vehicle doors and/or to activate vehicle engines. For instance, key fobs wirelessly communicate with vehicles to initiate unlocking of vehicle doors and/or activation of vehicle engines.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for pre-fluxing motors of vehicle door e-latches. An example disclosed vehicle includes a door including a handle that includes a switch. The handle also includes an e-latch that includes a latch and a motor for the latch. Responsive to detecting grasping of the handle via the switch, the e-latch is to pre-flux the motor and transmit an authentication request. The example disclosed vehicle also includes a body control module to cause the motor to unlock the door via the latch responsive to authenticating a fob upon receiving the authentication request.

In some examples, to pre-flux the motor, the e-latch provides the motor with a fraction of a current that is configured to enable the motor to actuate the latch from a locked position to an unlocked position. In some examples, the e-latch pre-fluxes the motor to reduce latency in unlocking of the door by initiating magnetism in the motor prior to driving the latch to an unlocked position. In some examples, the motor is pre-fluxed while the body control module authenticates the fob. In some examples, the e-latch simultaneously pre-fluxes the motor and transmits the authentication request. In some examples, the e-latch is configured to pre-flux the motor and transmit the authentication request only when the door is locked.

In some examples, the handle includes a lever that is coupled to the switch and configured to actuate when a user grasps the handle. In such examples, actuation of the lever causes actuation of the switch to enable the e-latch to detect when the handle is being grasped via the switch.

In some examples, to lock the door, the e-latch fully energizes the motor to drive the latch to a locked position. In some such examples, to unlock the door, the e-latch de-energizes the motor to cause the latch to be in an unlocked position. Further, in some such examples, when the motor is pre-fluxed by the e-latch, the motor is configured to keep the latch in the unlocked position. Moreover, some such examples further include a position sensor to monitor a position of the latch when the motor is pre-fluxed. Furthermore, in some such examples, responsive to detecting that the latch is in the unlocked position when the motor is pre-fluxed, the e-latch causes the motor to return the latch to the locked position until the fob is authenticated.

In some examples, the body control module authenticates the fob prior to unlocking the door to verify that an authorized user is attempting to enter a vehicle cabin. Some example further include a communication module that is configured to wirelessly communication with the fob. In some such examples, to authenticate the fob, the body control module is to broadcast an authentication beacon for the fob via the communication module, receive a return signal that includes a digital key from the fob, and identify the fob as corresponding to an authorized user based on the digital key.

In some examples, responsive to not authenticating the fob, the body control module prevents the e-latch from unlocking the door.

In some examples, to pre-flux the motor, the e-latch provides a pulse-width-modulation (PWM) signal to the motor at a fraction of a full duty cycle. In some examples, to enable pre-fluxing of the motor, the e-latch includes a current-controlled MOSFET. In such examples, the current-controlled MOSFET includes an H-bridge that is biased to provide an amount of current that pre-fluxes the motor without driving the latch to an unlocked position.

Some examples further include a plurality of doors that include a respective plurality of e-latches communicatively coupled to the body control module.

An example disclosed method includes detecting, via a switch, a handle of a door being grasped. The example disclosed method also includes, responsive to detecting grasping of the handle, pre-fluxing a motor and transmitting an authentication request via an e-latch. The motor is to drive a latch of the e-latch. The example disclosed method also includes authenticating, via a body control module, a fob upon receipt of the authentication request and causing, responsive to authenticating the fob, the motor to unlock the door via the latch.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Typically, keys are utilized to unlock and lock doors of a vehicle and to activate an engine of the vehicle. Traditionally, mechanical keys have been utilized to unlock vehicle doors and to activate ignition of vehicle engines. For instance, a mechanical key is inserted into a keyhole and rotated to unlock a door and/or to start an engine. Recently, key fobs have been utilized to unlock vehicle doors and/or to activate vehicle engines. For instance, key fobs wirelessly communicate with vehicles to initiate unlocking of vehicle doors and/or activation of vehicle engines.

In some instances, a passive-start system starts an engine in response to detecting that a user has pressed a start button and identifying that a key fob is within a cabin of the vehicle when the start button is pressed. Further, in some instances, a passive-entry system unlocks a door in response to detecting that a user has grasped a handle of a door and identifying that a key fob is near the vehicle when a handle is grasped. In some such instances, the user potentially may notice latency between the grasping the handle and the door unlocking. For instance, processing time needed to (i) detect the grasping of the handle, (ii) authentication of the key fob, and (iii) unlatching of the door may potentially be long enough that the user notices a delay.

Example methods and apparatus disclosed herein reduce latency in unlocking a door for a passive-entry system by pre-fluxing a motor of an electronic latch (also referred to as an e-latch of the door upon detecting that a door handle has been grasped and prior to authenticating a key fob. As used herein, "passive entry" and "passive-entry" refer to a system of a vehicle that unlock(s) and/or unlatch(es) one or more doors of the vehicle upon authenticating a key fob of the vehicle. In some examples, a passive-entry system unlocks a door in response to (1) detecting that a user has touched a handle of the door and (2) verifying that an authorized key fob is near the vehicle when the handle is touched. As used herein, a "key fob" and a "fob" refer to an electronic mobile device (e.g., a dedicated electronic mobile device, a smart phone, a wearable, a smart watch, a tablet, etc.) that wirelessly communicates with a vehicle to unlock and/or lock one or more doors of the vehicle.

Examples disclosed herein include a door, an e-latch, a door handle, a handle sensor (e.g., including a lever and a switch), and a body control module of a vehicle. The e-latch includes a mechanical latch that is configured to lock and/or unlock the door. Further, the e-latch includes a motor to drive the latch between a locked position and an unlocked position. When the handle sensor detects that the door handle is grasped, the e-latch simultaneously (1) pre-fluxes the motor of the e-latch and (2) initiates an authentication protocol. The body control module performs the authentication protocol to confirm that an authorized key fob of the vehicle is near the vehicle when the door handle is grasped. After the key fob is authenticated, the e-latch unlocks and unlatches the door by sending a signal to the pre-fluxed motor to drive the latch to the unlocked position. The system pre-fluxes the motor of the e-latch to reduce the amount of time it takes for the motor to drive the latch to the unlocked position upon receiving the signal, thereby reducing latency between the user grasping the door handle and the door unlocking.

Figure 1:
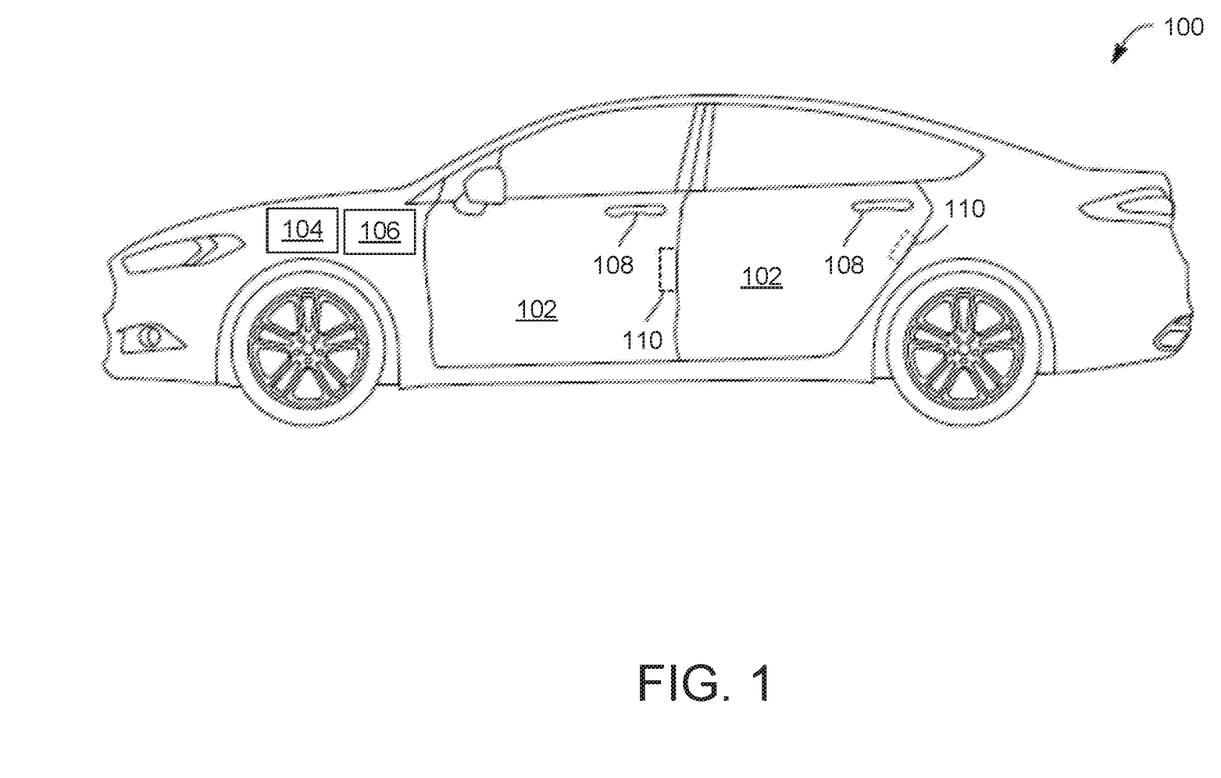
FIG. 1 illustrates an example vehicle in accordance with the teachings herein.

Turning to the figures, FIG. 1 illustrates an example vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). In the illustrated example, the vehicle 100 includes doors 102, a body control module 104 (also referred to as a BCM), and a communication module 106.

Each of the doors 102 enable a user to access a cabin of the vehicle 100. In the illustrated example, each of the doors 102 includes a door handle 108 (also referred to as a handle) and an electronic latch 110 (also referred to as an e-latch) to facilitate the user in accessing the cabin of the vehicle 100. In other examples, less than all of the doors 102 may include the door handle 108 and/or the e-latch 110. The door handle 108 is configured to be grasped by a user to enable the user to open and/or close the corresponding one of the doors 102. Further, as disclosed below in further detail, the e-latch 110 is an electromechanical device that enables the corresponding one of the doors 102 to be locked and unlocked to prevent and provide, respectively, access to the vehicle cabin.

The body control module 104 of the illustrated example is an electronic control unit (ECU) of the vehicle 100. ECUs monitor and control the subsystems of the vehicle 100. For example, the ECUs are discrete sets of electronics that include their own circuit(s) (e.g., integrated circuits, microprocessors, memory, storage, etc.) and firmware, sensors, actuators, and/or mounting hardware. The ECUs communicate and exchange information (e.g., via a vehicle data bus). Additionally, the ECUs may communicate properties (e.g., status of the ECUs, sensor readings, control state, error and diagnostic codes, etc.) to and/or receive requests from each other. For example, the vehicle 100 may include dozens of ECUs that are positioned in various locations around the vehicle 100.

The body control module 104 controls one or more subsystems throughout the vehicle 100, such as power windows, an immobilizer system, power mirrors, etc. For example, the body control module 104 includes circuits that drive one or more of relays (e.g., to control wiper fluid, etc.), brushed direct current (DC) motors (e.g., to control power seats, power windows, wipers, etc.), stepper motors, LEDs, etc. In the illustrated example, the body control module 104 is communicatively coupled to the e-latch 110 of each of the doors 102 to facilitate operation of a passive-entry system of the vehicle 100.

Figure 4:
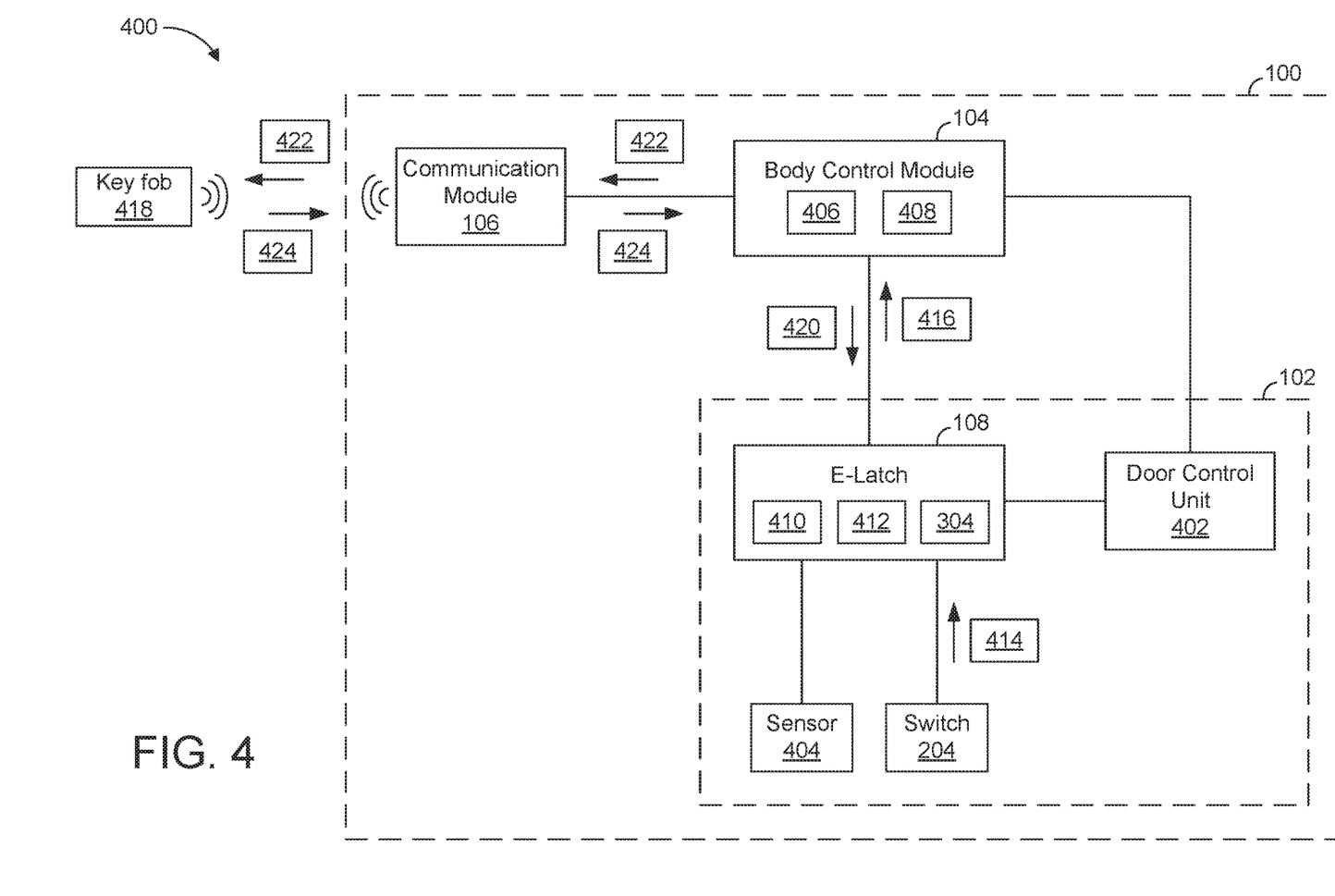
FIG. 4 is a block diagram of electronic components of the vehicle of FIG. 1.

The communication module 106 of the illustrated example includes wired or wireless network interface(s) that enable communication with other devices (e.g., a key fob 418 of FIG. 4). The communication module 106 includes hardware (e.g., processors, memory, storage, antenna, etc.) and software to control the wired or wireless network interface(s). In some examples, the communication module 106 includes a wireless personal area network (WPAN) module that is configured to wirelessly communicate with nearby device(s) via short-range wireless communication protocol(s). For example, the communication module 106 includes antenna(s) to wirelessly communicate via the Bluetooth® and/or Bluetooth® Low Energy (BLE) protocols. Additionally or alternatively, the communication module 106 includes antenna(s) to wirelessly communicate via Wi-Fi®, low frequency (LF) communication, Near Field Communication (NFC), ultra-wide band (UWB) communication, ultra-high frequency (UHF) communication, and/or any other wireless communication protocol. Additionally or alternatively, the communication module 106 includes wired or wireless network interface(s) that enable communication with external networks. For example, the communication module 106 is configured to wirelessly communicate with a nearby device via an external network. The external network(s) may be a public network, such as the Internet; a private network, such as an intranet; or combinations thereof, and may utilize a variety of networking protocols now available or later developed including, but not limited to, TCP/IP-based networking protocols. For example, the communication module 106 includes one or more communication controllers for cellular networks, such as Global System for Mobile Communications (GSM), Universal Mobile Telecommunications System (UMTS), Long Term Evolution (LTE), Code Division Multiple Access (CDMA).

Figure 2:
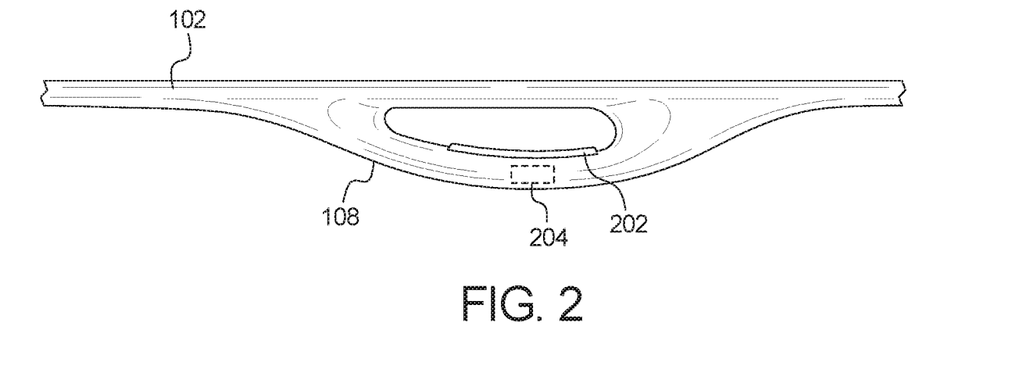
FIG. 2 illustrates an example door handle of the vehicle of FIG. 1.

FIG. 2 illustrates the door handle 108 of one or more of the doors 102 of the vehicle 100. As illustrated in FIG. 2, the door handle 108 includes a lever 202 and a switch 204. The lever 202 is configured to actuate when a user grasps the door handle 108. Additionally, the lever 202 is coupled to the switch 204 such that actuation of the lever 202 causes actuation of the switch 204. For example, the switch 204 is in a first position when the lever 202 is at a disengaged position (e.g., when the user is not grasping the door handle 108), and the switch 204 is in a second position when the lever 202 is at an engaged position (e.g., when the user is grasping the door handle 108).

Further, the switch 204 is communicatively coupled to the e-latch 110 of the corresponding one of the doors 102. The e-latch 110 is configured to detect whether the door handle 108 is being grasped based the position of the switch 204. That is, the switch 204 enables the e-latch to detect when the door handle 108 is being grasped. For example, when the switch 204 is in a position that corresponds with the door handle 108 being grasped, the e-latch 110 detects that the door handle 108 is being grasped. When the switch is in a position that corresponds with the door handle 108 not being grasped, the e-latch 110 detects that the door handle 108 is not being grasped.

Figure 3:
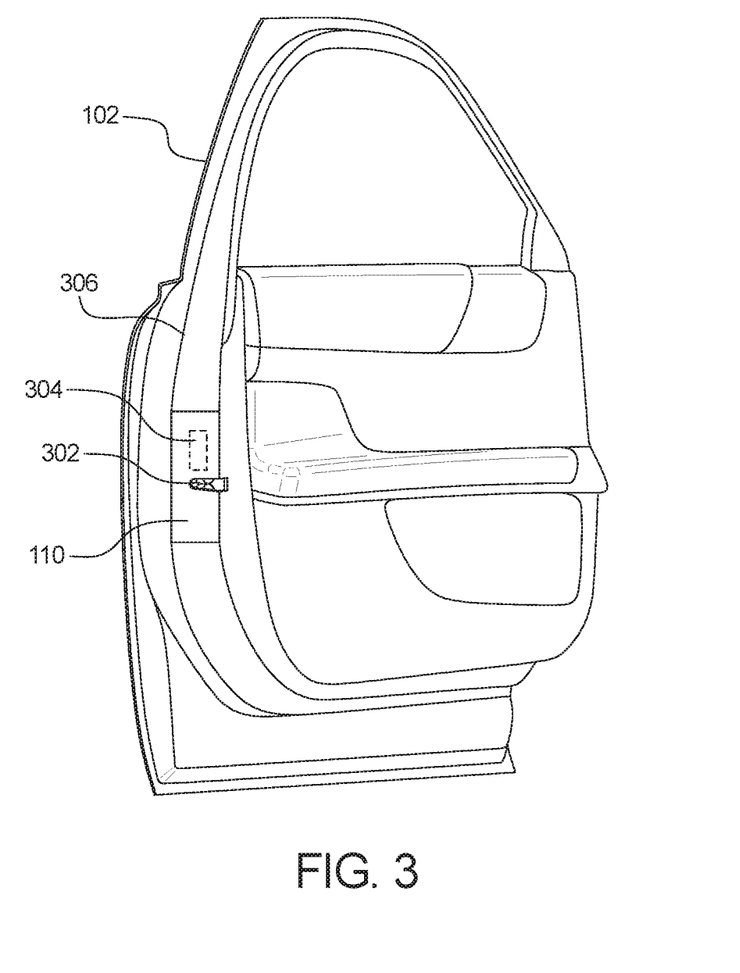
FIG. 3 illustrates an e-latch of a door of the vehicle of FIG. 1.

FIG. 3 illustrates the e-latch 110 of one of the doors 102 of the vehicle 100. As illustrated in FIG. 3, the e-latch 110 includes a latch 302 and a motor 304 that is configured to actuate the latch 302. For example, the latch 302 is configured to actuate between an unlocked position and a locked position. When the door 102 is closed and the latch 302 is in the locked position, the latch 302 fastens to a frame of the vehicle 100 to lock the door 102. Further, when the door 102 is closed and the latch 302 is in the unlocked position, the latch 302 unfastens from the frame to unlock the door 102. In the illustrated example, the e-latch 110 is positioned along an end 306 of the door 102 to enable the latch 302 to fasten to and unfasten from the frame of the vehicle 100 when the door 102 is closed.

The motor 304 of the illustrated example is configured to drive the latch 302 between the locked position and the unlocked position. For example, when the motor 304 is de-energized, the motor 304 causes the latch 302 to be in the locked position to lock the door 102. The e-latch 110 de-energizes the motor 304 by not providing current to the motor 304. In contrast, when the motor 304 is fully energized, the motor 304 drives the latch 302 to the unlocked position to unlock the door 102. The e-latch 110 fully energizes the motor 304 by providing an amount of current that is configured to enable the motor 304 to actuate the latch 302 from the locked position to the unlocked position.

The e-latch 110 also is configured to pre-flux the motor 304. The e-latch 110 pre-fluxes the motor 304 to reduce latency in unlocking of the door 102 within a passive-entry system (e.g., by about 20 milliseconds) by initiating magnetism in the motor 304 prior to driving the latch 302 from the locked position to the unlocked position. To pre-flux the motor 304, the e-latch 110 provides the motor 304 with a fraction of the current that is configured to fully energize the motor 304 (e.g., 30% of the amount of current that corresponds with a fully-energized motor). That is, thee-latch 110 pre-fluxes the motor 304 by providing a fraction of the current that is configured to enable the motor 304 to actuate the latch 302 from the locked position to the unlocked position. In turn, the motor 304 is configured to keep the latch 302 in the unlocked position when the motor 304 is pre-fluxed by the e-latch 110. In some examples, the e-latch 110 pre-fluxes the motor 304 by providing a pulse-width-modulation (PWM) signal to the motor 304 at a fraction of a fully duty cycle that corresponds with the motor 304 being fully energized. In other examples, thee-latch 110 includes a current-controlled MOSFET (metal-oxide-semi-conductor field-effect transistor) to enable pre-fluxing of the motor 304. In such examples, the current-controller MOSFET includes an H-bridge that is biased to provide an amount of current that pre-fluxes the motor 304 without driving the latch 302 to the unlocked position.

FIG. 4 is a block diagram of electronic components 400 of the vehicle 100. As illustrated in FIG. 4, the electronic components 400 of the vehicle 100 include the body control module 104 and the communication module 106. Further, the electronic components 400 include the e-latch 110, a door control unit 402, the switch 204, and a latch sensor 404 for each of one or more of the doors 102.

The body control module 104 of the illustrated example includes a processor 406 (also referred to as a microcontroller unit and a controller) and memory 408. The processor 406 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 408 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 408 includes multiple kinds of memory, particularly volatile memory and non-volatile memory.

The memory 408 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 408, the computer readable medium, and/or within the processor 406 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The e-latch 110 of the illustrated example includes a processor 410 (also referred to as a microcontroller unit and a controller), memory 412, and the motor 304. The processor 410 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 412 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 412 includes multiple kinds of memory, particularly volatile memory and non-volatile memory.

The memory 412 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 412, the computer readable medium, and/or within the processor 410 during execution of the instructions.

The door control unit 402 of the illustrated example is another ECU of the vehicle 100 that performs various functions of the door 102. The door control unit 402 includes hardware (e.g., discrete components, integrated circuits, motors, a processor, etc.) and software to control operation of one or more components of the door 102 (e.g., a window, a side mirror, etc.). Further, the door control unit 402 includes and/or is electrically coupled to inputs (e.g., toggles, switches, buttons, etc.) to enable a user to control the various functions of the door 102. For example, the door control unit 402 controls the position of a window, a side view mirror, etc. based upon input received from the user.

In operation, the switch 204 indicates when a user is grasping the door handle 108 of the door 102. For example, the e-latch 110 detects that the door handle 108 is being grasped in response to receiving an actuation signal 414 via the switch 204. The e-latch 110 is configured to (i) receive the actuation signal 414 when the switch 204 is in an engaged position and (ii) not receive the actuation signal 414 when the switch 204 is in a disengaged position. Further, the lever 202 actuates the switch 204 to the engaged position when a user grasps the door handle 108 such that the lever is actuated to an engaged position. The lever 202 causes the switch 204 to be in the disengaged position when the lever 202 is in a disengaged position (e.g., when the user is not grasping the door handle 108).

Responsive to detecting that the door handle 108 is being grasped, the e-latch 110 pre-fluxes the motor 304 and transmits an authentication request 416 to the body control module 104. For example, the e-latch 110 transmits the authentication request 416 to instruct the body control module 104 to determine whether an authorized user with a corresponding key fob 418 is attempting to open the door 102. In some examples, the e-latch 110 simultaneously pre-fluxes the motor 304 and transmits the authentication request 416. In turn, the motor 304 is pre-fluxed while the body control module 104 authenticates the key fob 418 of the user. Further, in some examples, the e-latch 110 is configured to pre-flux the motor 304 and transmit the authentication request 416 only when the door 102 is locked. That is, the e-latch 110 does not pre-flux the motor 304 or transmit the authentication request 416 if the door 102 is already unlocked.

The e-latch 110 pre-fluxes the motor 304 while the body control module 104 authenticates the key fob 418 to reduce latency in unlocking the door 102. For example, the motor 304 drives the latch 302 from an locked position to an unlocked position after the body control module 104 authenticates the key fob 418. In some examples, it may take the body control module 104 between about 95 milliseconds and 105 to authenticate the key fob 418. Without pre-fluxing the motor 304, it takes the motor 304 a substantially extended period of time (e.g., about 50 milliseconds) to drive the latch 302 from the locked position to the unlocked position. By pre-fluxing the motor 304 while the body control module 104 authenticates the key fob 418, it takes the motor 304 a substantially reduced period of time (e.g., about 30 milliseconds) to drive the latch 302 from the locked position to the unlocked position. In turn, the likelihood of the user noticing a delay in the unlocking of the door 102 is significantly reduced.

Upon receiving the authentication request 416 from the e-latch 110, the body control module 104 authenticates the key fob 418 to verify that an authorized user of the vehicle 100 is attempting to enter the cabin of the vehicle 100. If the body control module 104 authenticates the key fob 418, the body control module 104 sends an unlock signal 420 to instruct the e-latch 110 to unlock the door 102 for the user. For example, the body control module 104 causes the motor 304 to unlock the door 102 via the latch 302 in response to authenticating the key fob 418. In contrast, if the body control module 104 does not authenticate a key fob, the body control module 104 prevents the e-latch 110 from unlocking the door 102 (e.g., by sending a lock signal) for a predetermined period of time.

To authenticate the key fob 418, the body control module 104 of the illustrated example broadcasts an authentication beacon 422 (e.g., a low-frequency beacon, a Bluetooth® beacon, a BLE beacon) via the communication module 106. If the key fob 418 is within a predetermined distance of the door 102, the key fob 418 is configured to receive the authentication beacon 422 broadcasted by the communication module 106. Upon receiving the authentication beacon 422, the key fob 418 is configured to send a return signal 424 that includes a digital key to the communication module 106. Upon the communication module 106 receiving the return signal 424 from the key fob 418, the body control module 104 authenticates the key fob 418 based on the digital key. That is, the body control module 104 identifies the key fob 418 as corresponding to the an authorized user of the vehicle 100 based on the digital key of the key fob 418.

Further, in the illustrated example, thee-latch 110 includes the latch sensor 404 that is configured to monitor a position of the latch 302. For example, the latch sensor 404 detects whether the latch 302 is in the locked position or the unlocked position. The latch 302 is configured to be in the unlocked position when the motor 304 is fully energized.

Further, the latch 302 is configured to be in the locked position when the motor 304 is de-energized and when the motor 304 is pre-fluxed. In some instances, the motor 304 may unintentionally drive the latch 302 to the unlocked position upon being pre-fluxed. In such instances, the latch sensor 404 detects that the latch 302 is in the unlocked position. The e-latch 110 is configured to cause the motor 304 to return the latch 302 to the locked position (e.g., by switching the polarity of an H-bridge) until the key fob 418 is authenticated responsive to detecting that the latch 302 is in the locked position when the motor 304 is pre-fluxed.

Figure 5:
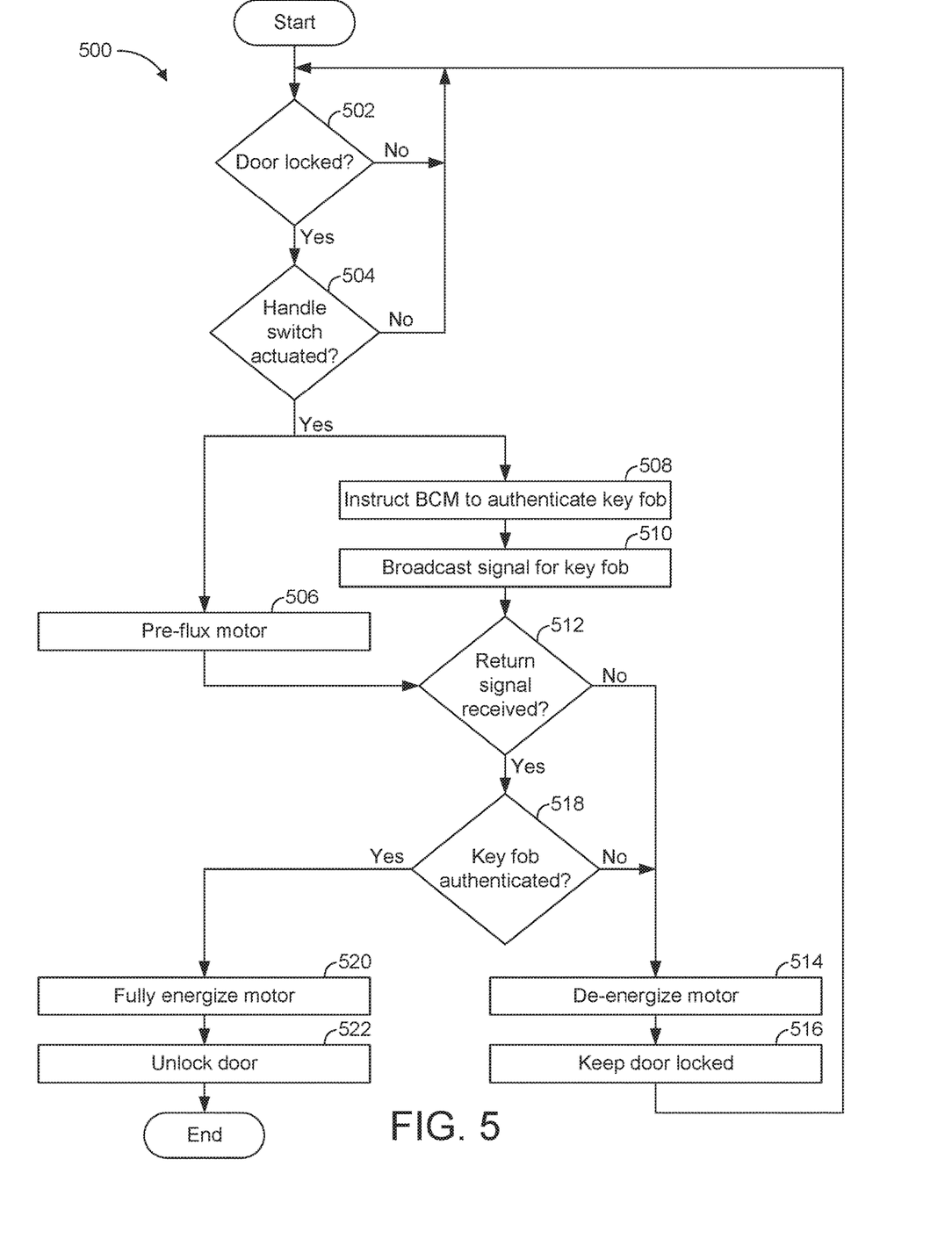
FIG. 5 is a flowchart for pre-fluxing a motor of an e-latch of a vehicle door in accordance with the teachings herein.

FIG. 5 is a flowchart of an example method 500 to pre-flux a motor of an e-latch of a vehicle door in accordance with the teachings herein. The flowchart of FIG. 5 is representative of machine readable instructions that are stored in memory (such as the memory 408 and/or the memory 412 of FIG. 4) and include one or more programs which, when executed by one or more processors (such as the processor 406 and/or the processor 406 of FIG. 4), cause the vehicle 100 to implement the example e-latch 110 and/or the example body control module 104 of FIGS. 1 and 4. While the example program is described with reference to the flowchart illustrated in FIG. 5, many other methods of implementing the example e-latch 110 and/or the example body control module 104 may alternatively be used. For example, the order of execution of the blocks may be rearranged, changed, eliminated, and/or combined to perform the method 500. Further, because the method 500 is disclosed in connection with the components of FIGS. 1-4, some functions of those components will not be described in detail below.

Initially, at block 502, the e-latch 110 of one of the doors 102 determines whether the corresponding one of the doors 102 is locked. In response to the e-latch 110 determining that the door 102 is locked, the method 500 returns to block 502. Otherwise, in response to the e-latch 110 determining that the door 102 is not locked (i.e., unlocked), the e-latch 110 proceeds to block 504. At block 504, the e-latch 110 detects whether the switch 204 has been actuated to an engaged position. For example, the switch 204 actuates to the engaged position when a user actuates the lever 202 to an engaged position by grasping the door handle 108. In response to the e-latch 110 detecting that the switch 204 is not actuated to the engaged position, the method 500 returns to block 502. Otherwise, in response to the e-latch 110 detecting that the switch 204 is actuated to the engaged position, the method 500 proceeds to blocks 506, 508 in parallel.

At block 506, the e-latch 110 pre-fluxes the motor 304. At block 508, the e-latch 110 transmits the authentication request 416 to instruct the body control module 104 to authenticate the key fob 418. At block 510, upon receiving the authentication request 416, the body control module 104 transmits the authentication beacon 422 via the communication module 106.

At block 512, the body control module 104 identifies whether the communication module 106 has received the return signal 424 from the key fob 418. In response to the body control module 104 identifying that the communication module 106 has not received the return signal 424, the method 500 proceeds to block 514 at which the e-latch 110 de-energizes the motor 304 to cause the latch 302 to be in the locked position. In turn, the e-latch 110 keeps the door 102 locked at block 516.

Returning to block 512, the method 500 proceeds to block 518 in response to the body control module 104 identifying that the communication module 106 has received the return signal 424 from the key fob 418. At block 518, the body control module 104 determines whether the key fob 418 is authenticated for use with the vehicle 100. In response to the body control module 104 determining that the key fob 418 is not authenticated, the method 500 proceeds to block 514. Otherwise, in response to the body control module 104 determining that the key fob 418 is authenticated, the method 500 proceeds to block 520 at which the e-latch 110 fully energizes the motor 304 to drive the latch 302 to the unlocked position. In turn, the e-latch 110 unlocks the door 102 at block 522.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively. Additionally, as used herein, the terms "module" and "unit" refer to hardware with circuitry to provide communication, control and/or monitoring capabilities. A "module" and a "unit" include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a door including:
   a handle including a switch; and
   an e-latch including:
   a latch; and
   a motor for the latch,
   wherein, responsive to detecting grasping of the handle via the switch, the e-latch is configured to pre-flux the motor and transmit an authentication request; and
   a body control module to cause the motor to unlock the door via the latch responsive to authenticating a fob upon receiving the authentication request, wherein the motor is pre-fluxed while the body control module authenticates the fob.

2. The vehicle of claim 1, wherein, to pre-flux the motor, the e-latch provides the motor with a fraction of a current that is configured to enable the motor to actuate the latch from a locked position to an unlocked position.

3. The vehicle of claim 1, wherein the e-latch pre-fluxes the motor to reduce latency in unlocking of the door by initiating magnetism in the motor prior to driving the latch to an unlocked position.

4. The vehicle of claim 1, wherein the e-latch simultaneously pre-fluxes the motor and transmits the authentication request.

5. The vehicle of claim 1, wherein the e-latch is configured to pre-flux the motor and transmit the authentication request only when the door is locked.

6. The vehicle of claim 1, wherein the handle includes a lever that is coupled to the switch and configured to actuate when a user grasps the handle, wherein actuation of the lever causes actuation of the switch to enable the e-latch to detect when the handle is being grasped via the switch.

7. The vehicle of claim 1, wherein, to unlock the door, the e-latch fully energizes the motor to drive the latch to an unlocked position.

8. The vehicle of claim 7, wherein, to lock the door, the e-latch de-energizes the motor to cause the latch to be in a locked position.

9. The vehicle of claim 8, wherein, when the motor is pre-fluxed by the e-latch, the motor is configured to keep the latch in the locked position.

10. The vehicle of claim 9, further including a position sensor to monitor a position of the latch when the motor is pre-fluxed.

11. The vehicle of claim 10, wherein, responsive to detecting that the latch is in the unlocked position when the motor is pre-fluxed, the e-latch causes the motor to return the latch to the locked position until the fob is authenticated.

12. The vehicle of claim 1, wherein the body control module authenticates the fob prior to unlocking the door to verify that an authorized user is attempting to enter a vehicle cabin.

13. The vehicle of claim 1, further including a communication module that is configured to wirelessly communicate with the fob.

14. The vehicle of claim 13, wherein, to authenticate the fob, the body control module is to:
broadcast an authentication beacon for the fob via the communication module;
receive a return signal that includes a digital key from the fob; and
identify the fob as corresponding to an authorized user based on the digital key.

15. The vehicle of claim 1, wherein, responsive to not authenticating the fob, the body control module prevents the e-latch from unlocking the door.

16. The vehicle of claim 1, wherein, to pre-flux the motor, the e-latch provides a pulse-width-modulation (PWM) signal to the motor at a fraction of a full duty cycle.

17. The vehicle of claim 1, wherein, to enable pre-fluxing of the motor, the e-latch includes an H-bridge that is biased to provide an amount of current that pre-fluxes the motor without driving the latch to an unlocked position.

18. A method comprising:
detecting, via a switch, a handle of a door being grasped;
responsive to detecting grasping of the handle, pre-fluxing a motor and transmitting an authentication request via an e-latch, wherein the motor is configured to drive a latch of the e-latch;
authenticating, via a body control module, a fob upon receipt of the authentication request; and
causing, responsive to authenticating the fob, the motor to unlock the door via the latch, wherein the motor is pre-fluxed while the body control module authenticates the fob.

19. A vehicle comprising
a door including:
a handle including a switch; and
an e-latch including:
a latch; and
a motor for the latch,
wherein, responsive to detecting grasping of the handle via the switch, the e-latch is to pre-flux the motor and transmit an authentication request;
a body control module to cause the motor to unlock the door via the latch responsive to authenticating a fob upon receiving the authentication request; and
wherein, responsive to detecting that the latch is in an unlocked position when the motor is pre-fluxed, the e-latch causes the motor to return the latch to a locked position until the fob is authenticated.

* * * * *